United States Patent
Nie et al.

(10) Patent No.: US 12,260,626 B2
(45) Date of Patent: Mar. 25, 2025

(54) METHOD FOR RE-RECOGNIZING OBJECT IMAGE BASED ON MULTI-FEATURE INFORMATION CAPTURE AND CORRELATION ANALYSIS

(71) Applicant: SHANDONG JIANZHU UNIVERSITY, Jinan (CN)

(72) Inventors: Xiushan Nie, Jinan (CN); Xue Zhang, Jinan (CN); Chuntao Wang, Jinan (CN); Peng Tao, Jinan (CN); Xiaofeng Li, Jinan (CN)

(73) Assignee: SHANDONG JIANZHU UNIVERSITY, Jinan (CN)

( * ) Notice: Subject to any disclaimer, the term of this patent is extended or adjusted under 35 U.S.C. 154(b) by 425 days.

(21) Appl. No.: 17/876,585

(22) Filed: Jul. 29, 2022

(65) Prior Publication Data

US 2022/0415027 A1  Dec. 29, 2022

Related U.S. Application Data

(63) Continuation-in-part of application No. PCT/CN2022/070929, filed on Jan. 10, 2022.

(30) Foreign Application Priority Data

Jun. 29, 2021 (CN) .......................... 202110732494.2

(51) Int. Cl.
*G06V 10/778* (2022.01)
*G06V 10/74* (2022.01)
*G06V 10/75* (2022.01)

(52) U.S. Cl.
CPC .......... *G06V 10/778* (2022.01); *G06V 10/751* (2022.01); *G06V 10/761* (2022.01)

(58) Field of Classification Search
CPC .. G06V 10/778; G06V 10/751; G06V 10/761; G06V 10/242; G06V 10/75;
(Continued)

(56) References Cited

U.S. PATENT DOCUMENTS

| | | | |
|---|---|---|---|
| 2021/0012146 A1* | 1/2021 | Zhai | G06V 30/1916 |
| 2021/0150118 A1* | 5/2021 | Le | G06N 3/044 |

FOREIGN PATENT DOCUMENTS

| | | | |
|---|---|---|---|
| CN | 110751018 A | * | 2/2020 |
| CN | 111539370 A | | 8/2020 |

(Continued)

*Primary Examiner* — Oneal R Mistry
*Assistant Examiner* — Justin Philip Cascais
(74) *Attorney, Agent, or Firm* — Bayramoglu Law Offices LLC

(57) ABSTRACT

A method for re-recognizing an object image is provided based on multi-feature information capture and correlation analysis weights of an input feature map by using a convolutional layer with a spatial attention mechanism and a channel attention mechanism, causing channel and spatial information to effectively combined, which not only focus on an important feature and suppress an unnecessary feature, but also improve a representation of a feature. A multi-head attention mechanism is used to process a feature after an image is divided into blocks to capture abundant feature information and determine a correlation between features to improve performance and efficiency of object image retrieval. The convolutional layer with the channel attention mechanism and the spatial attention mechanism is combined with a transformer having the multi-head attention mechanism to focus on globally important features and capture fine-grained features, thereby improving performance of re-recognition.

3 Claims, 2 Drawing Sheets

(58) Field of Classification Search
CPC .. G06V 10/806; G06V 10/82; G06V 2201/08; G06V 20/54
See application file for complete search history.

(56) References Cited

FOREIGN PATENT DOCUMENTS

| | | | | |
|---|---|---|---|---|
| CN | 111553205 A | * | 8/2020 | ......... G06K 9/00664 |
| CN | 113449131 A | | 9/2021 | |

* cited by examiner

METHOD FOR RE-RECOGNIZING OBJECT IMAGE BASED ON MULTI-FEATURE INFORMATION CAPTURE AND CORRELATION ANALYSIS

CROSS REFERENCES TO THE RELATED APPLICATIONS

This application is the continuation-in-part application of International Patent Application No. PCT/CN2022/070929 filed on Jan. 10, 2022, which claims priority based on Chinese patent application 202110732494.2 filed on Jun. 29, 2021. The disclosures of the aforementioned applications are hereby incorporated by reference in their entireties.

TECHNICAL FIELD

The present disclosure relates to the technical field of image retrieval, and specifically, to a method for re-recognizing an object image based on multi-feature information capture and correlation analysis.

BACKGROUND

In recent years, booming artificial intelligence, computer vision, and other technologies have been widely used in various fields. With the continuous development of the information era, the combination of computer vision with object sales and management has become a current hot topic of concern. For a queried object image, object image re-recognition can retrieve all images of a same object by using a plurality of different cameras. The object re-recognition technology not only can improve people's shopping experience, but also can save costs, improve productivity, and reduce a loss rate of objects. An object image re-recognition system is also widely used, not only in retail stores, supermarkets, and other retail industries, but also in logistics companies, warehouses and other large places.

The existing image re-recognition methods include image re-recognition methods based on hand-crafted features and image re-recognition methods based on deep learning. The image re-recognition methods based on hand-crafted features use inherent attributes of an image to re-recognize the image. However, the image re-recognition methods based on hand-crafted features are limited to certain image types, and thus have a poor generalization capability and are time-consuming. Some image re-recognition methods based on deep learning focusing on global information fail to capture subtle differences between features and ignore importance of local information. Some image re-recognition methods based on deep learning can only capture partial important information and cannot take overall information into account, resulting in low accuracy of image re-recognition.

SUMMARY

In order to overcome the shortcomings of the above technologies, the present disclosure provides a method for improving efficiency and accuracy of object re-recognition.

The technical solution used in the present disclosure to resolve the technical problem thereof is as follows:

A method for re-recognizing an object image based on multi-feature information capture and correlation analysis includes:

a) collecting a plurality of object images to form an object image re-recognition database, labeling identifier (ID) information of an object image in the database, and dividing the database into a training set and a test set;

b) establishing an object image re-recognition model based on multi-feature information capture and correlation analysis;

c) optimizing an objective function of the object image re-recognition model by using a cross-entropy loss function and a triplet loss function;

d) manually marking the collected object images with ID information, inputting the marked object images into an optimized object image re-recognition model in step c) for training to obtain a trained object image re-recognition model and storing the trained object image re-recognition model;

e) inputting a to-be-retrieved object image into the trained object image re-recognition model in step d) to obtain a feature of a to-be-retrieved object; and f) comparing the feature of the to-be-retrieved object with features of object images in the test set and sorting comparison results by similarity measurement.

Further, step b) includes the following steps:

b-1) setting an image input network to two branch networks, namely, a first feature branch network and a second feature branch network;

b-2) inputting an object image h in the training set into the first feature branch network, where $h \in R^{e \times w \times 3}$, R represents real number space, e represents a quantity of horizontal pixels of the object image h, w represents a quantity of vertical pixels of the object image h, and 3 represents a quantity of channels of each red, green, and blue (RGB) image; processing the object image h by using a convolutional layer to obtain a feature map f; processing the feature map f by using a channel attention mechanism; performing global average pooling and global maximum pooling on the feature map f once to obtain two one-dimensional vectors; normalizing the two one-dimensional vectors through convolution, ReLU activation function, 1*1 convolution, and sigmoid function operations in turn to give weight to the feature map f; performing maximum pooling and average pooling on all channels at each position in a weighted feature map f by using a spatial attention mechanism to obtain a maximum pooled feature map and an average pooled feature map respectively for stitching; performing 7*7 convolution on a stitched feature map and then normalizing the stitched feature map by using a batch normalization layer and a sigmoid function; and multiplying a normalized stitched feature map by the feature map f to obtain a new feature;

b-3) inputting the object image h in the training set into the second feature branch network, where $h \in R^{e \times w \times 3}$; dividing the image h into n two-dimensional blocks; representing embeddings of the two-dimensional blocks as a one-dimensional vector $h_i \in R^{n \times (p^2 \cdot 3)}$ by using a linear transformation layer, where p represents resolution of an image block, and $n = ew/p^2$; calculating an average embedding $h_a$ of all the blocks according to a formula $$h_a = \frac{\sum_i^n h_i}{n},$$

where $h_i$ represents an embedding of an $i^{th}$ block obtained through a Gaussian distribution initialization, and $i \in \{1, \ldots, n\}$; calculating an attention coefficient $a_i$ of the $i^{th}$ block according to a formula $a_i=q^T\sigma(W_1h_0+W_2h_i+W_3h_a)$, where $q^T$ represents a weight, $\sigma$ represents the sigmoid function, $h_0$ represents a class marker, and $W_1$, $W_2$, and $W_3$ are weights; calculating a new embedding $h_l$ of each block according to a formula $$h_l = \frac{\sum_{i=1}^{n} a_i h_i}{n};$$

and calculating a new class marker $h_0'$ according to a formula $h_0'=W_4[h_0\|h_l]$, where $W_4$ represents a weight;

b-4) taking the new class marker $h_0'$ and a sequence with an input size of $h_l \in \mathbb{R}^{n \times d_c}$ as an overall representation of a new image, where $d_c=d*m$, d represents a dimension size of a head of each self-attention mechanism in a multi-head attention mechanism, and m represents a quantity of heads of the multi-head attention mechanism; and adding position information in the new image, and then taking the new image as an input of a transformer encoder to complete the establishment of the object image re-recognition model.

Further, the transformer encoder in step b-4) includes the multi-head attention mechanism and a feedforward layer. The multi-head attention mechanism is composed of a plurality of self-attention mechanisms. A weight Attention $(h_l,i)$ of an $i^{th}$ value in the sequence $h_l \in \mathbb{R}^{n \times d}$ is calculated according to a formula $$\text{Attention}(h_l, i) = \text{Softmax}\left(\frac{Q_i^T K_i}{\sqrt{d}}\right) V_i,$$

where $Q_i$ represents an $i^{th}$ queried vector, T represents inversion, $K_i$ represents a vector of a correlation between $i^{th}$ queried information and other information, and $V_i$ represents a vector of the $i^{th}$ queried information. A new output embedding $SA(h_l)$ of the multi-head attention mechanism is calculated according to a formula $SA(h_l)=\text{Proj}(\text{Concat}_{i=1}^{m}(\text{Attention}(h_l,i)))$. An input h' of the feedforward layer is calculated according to a formula $h'=\omega LN(h_l+SA(h_l))$. An output y of the encoder is calculated according to a formula $y=\omega LN(h'+FFN(h'))$, where $\text{Proj}(\cdot)$ represents a linear mapping, $\text{Concat}(\cdot)$ represents a stitching operation based on the formula $FFN(h')=\partial W_2 (h_l W_1+c_1)+c_2$, $\partial$ represents a GELU activation function, $c_1$ and $c_2$ are learnable offsets, $\omega$ represents a ratio, and LN represents a normalization operation. The feature output from the first feature branch network and a feature y output from the second feature branch network are stitched into a feature vector of the object image.

Further, in step c), a cross-entropy loss $V_{ID}$ is calculated according to a formula $$V_{ID} = -\sum_{i=1}^{n} g_i \log(p_i) \begin{cases} g_i = 0, y \neq i \\ g_i = 1, y = i \end{cases},$$

where $g_i$ represents an indicator variable, n represents a number of classes in the training data set, and $p_i$ represents a predicted probability of a class-i image. The triplet loss function $V_t$ is calculated according to a formula $V_t=[\|v_a-v_p\|^2-\|v_a-\sigma_n\|^2+\alpha]_+$, where $\alpha$ represents a spacing, $v_a$ represents a sample of a class marker learned by a transformer, $v_p$ represents a positive sample of the class marker learned by the transformer, $v_n$ represents a negative sample of the class marker learned by the transformer, $[d]_+$ is $\max[d,0]$, and $d=\|v_a-v_p\|^2-\|v_a-v_n\|^2+\alpha$.

The present disclosure has the following beneficial effects: An input feature map is weighted by using a convolutional layer with a spatial attention mechanism and a channel attention mechanism, such that channel and spatial information is effectively combined, which can not only focus on an important feature and suppress an unnecessary feature, but also improve a representation of a concern to obtain a better feature. A transformer is used. A multi-head attention mechanism can better process a feature after an image is divided into blocks to capture more abundant feature information and can consider a correlation between features to obtain good performance and improve efficiency of object image retrieval. The convolutional layer with the channel attention mechanism and the spatial attention mechanism and the transformer with the multi-head attention mechanism are combined to globally focus on the important feature and better capture a fine-grained feature, thereby improving performance of re-recognition.

DETAILED DESCRIPTION OF THE EMBODIMENTS

Figure 1:
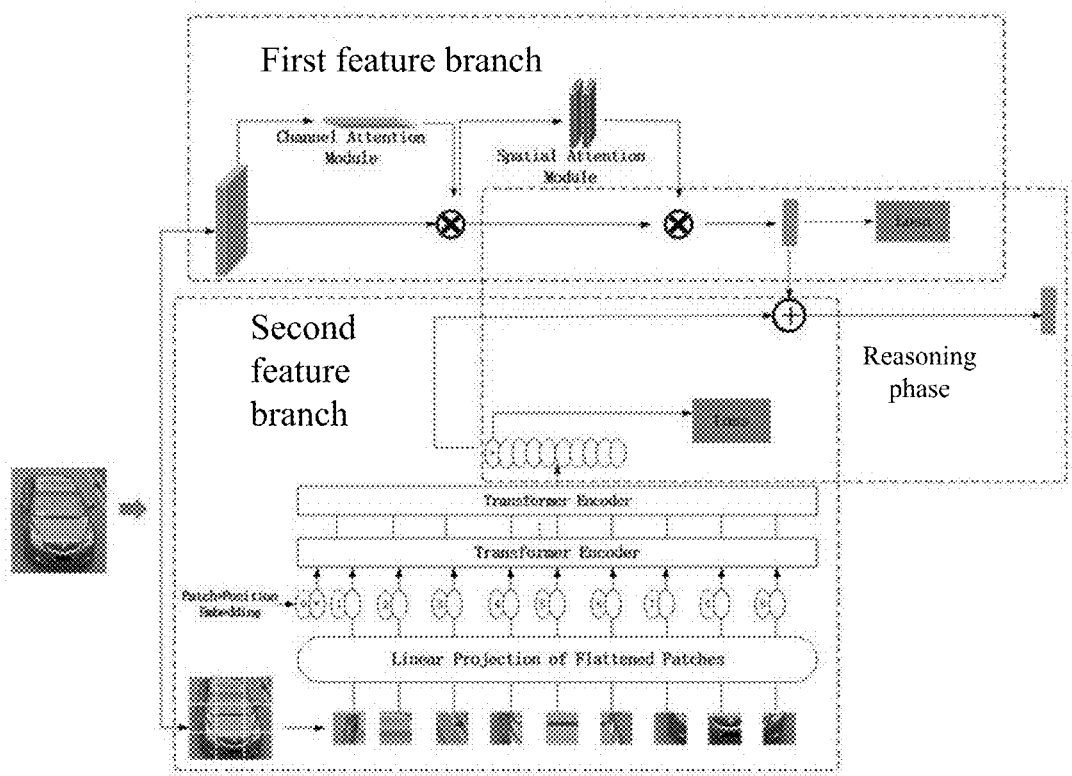
FIG. 1 shows a model of a method for re-recognizing an object image based on multi-feature information capture and correlation analysis according to the present disclosure.

The present disclosure will be described in detail below with reference to FIG. 1.

A method for re-recognizing an object image based on multi-feature information capture and correlation analysis includes the following steps:

a) Collect a plurality of object images to form an object image re-recognition database, label ID information of an object image in the database, and divide the database into a training set and a test set.

b) Establish an object image re-recognition model based on multi-feature information capture and correlation analysis.

c) Optimize an objective function of the object image re-recognition model by using a cross-entropy loss function and a triplet loss function.

d) Manually mark the collected object images with ID information, input the marked object images into an optimized object image re-recognition model in step c) for training to obtain a trained object image re-recognition model, and store the trained object image re-recognition model.

e) Input a to-be-retrieved object image into the trained object image re-recognition model in step d) to obtain a feature of a to-be-retrieved object.

f) Compare the feature of the to-be-retrieved object with features of object images in the test set and sort comparison results by similarity measurement.

An input feature map is weighted by using a convolutional layer with a spatial attention mechanism and a channel attention mechanism, such that channel and spatial information is effectively combined, which can not only focus on an important feature and suppress an unnecessary feature, but also improve a representation of a concern to obtain a better feature. A transformer is used. A multi-head attention mechanism can better process a feature after an image is divided into blocks to capture more abundant feature information and can take into account a correlation between features to obtain good performance and improve efficiency of object image retrieval. The convolutional layer with the channel attention mechanism and the spatial attention mechanism and the transformer with the multi-head attention mechanism are combined to globally focus on the important feature and better capture a fine-grained feature, thereby improving performance of re-recognition.

Step b) includes the following steps:

b-1) Set an image input network to two branch networks, namely, a first feature branch network and a second feature branch network.

b-2) Input an object image h in the training set into the first feature branch network, where $h \in R^{e \times w \times 3}$, R represents real number space, e represents a quantity of horizontal pixels of the object image h, w represents a quantity of vertical pixels of the object image h, and 3 represents a quantity of channels of each RGB image; process the object image h by using a convolutional layer to obtain a feature map f; process the feature map f by using the channel attention mechanism; perform global average pooling and global maximum pooling on the feature map f once to obtain two one-dimensional vectors; normalize the two one-dimensional vectors through convolution, ReLU activation function, 1*1 convolution, and sigmoid function operations to give weight to the feature map f; perform maximum pooling and average pooling on all channels at each position in a weighted feature map f by using the spatial attention mechanism to obtain a maximum pooled feature map and an average pooled feature map respectively for stitching; perform 7*7 convolution on a stitched feature map and then normalize the stitched feature map by using a batch normalization layer and a sigmoid function; and multiply a normalized stitched feature map by the feature map f to obtain a new feature.

b-3) Input the object image h in the training set into the second feature branch network, where $h \in R^{e \times w \times 3}$; divide the image h into n two-dimensional blocks; represent embeddings of the two-dimensional blocks as a one-dimensional vector $h_f \in R^{n \times (p_2 \cdot 3)}$ by using a linear transformation layer, where p represents resolution of an image block, and $n = ew/p^2$; in order to obtain a total quantity of blocks, namely, a length of a valid input sequence of the transformer, flatten these small blocks and map them into embeddings with a size of d, where because important information of some edges and corners may be omitted when the image is divided into the blocks, a different attention coefficient is allocated to each block by using an attention mechanism, and then an additional class marker k is added to the sequence; calculate an average embedding $h_a$ of all the blocks according to a formula $$h_a = \frac{\sum_{i}^{n} h_i}{n},$$

where $h_i$ represents an embedding that is of an $i^{th}$ block and obtained through initialization based on a Gaussian distribution, and $i \in \{1, \ldots, n\}$; calculate an attention coefficient $a_i$ of the $i^{th}$ block according to a formula $a_i = q^T \sigma(W_1 h_0 + W_2 h_i + W_3 h_a)$, where $q^T$ represents a weight, σ represents the sigmoid function, $h_0$ represents the class marker, and $W_1$, $W_2$, and $W_3$ are weights; calculate a new embedding h of each block according to a formula $$h_l = \frac{\sum_{i=1}^{n} a_i h_i}{n};$$

and calculate a new class marker $h_0'$ according to a formula $h_0' = W_4[h_0 \| h_l]$, where $W_4$ represents a weight.

b-4) Take the new class marker $h_0'$ and a sequence with an input size of $h_f \in R^{n \times d}$ as an overall representation of a new image, where $d_c = d*m$, d represents a dimension size of a head of each self-attention mechanism in the multi-head attention mechanism, and m represents a quantity of heads of the multi-head attention mechanism; and add position information in the new image, and then take the new image as an input of a transformer encoder to complete the establishment of the object image re-recognition model.

The transformer encoder in step b-4) includes the multi-head attention mechanism and a feedforward layer. The multi-head attention mechanism is composed of a plurality of self-attention mechanisms. A weight Attention($h_l$,i) of an $i^{th}$ value in the sequence $h_f \in R^{n \times d}$ is calculated according to a formula $$\text{Attention}(h_l, i) = \text{Softmax}\left(\frac{Q_i^T K_i}{\sqrt{d}}\right) V_i,$$

where $Q_i$ represents an $i^{th}$ queried vector, T represents inversion, $K_i$ represents a vector of a correlation between $i^{th}$ queried information and other information, and $V_i$ represents a vector of the $i^{th}$ queried information. A new output embedding SA($h_l$) of the multi-head attention mechanism is calculated according to a formula SA($h_l$)=Proj(Concat$_{i=1}^{m}$(Attention($h_l$,i))). An input h' of the feedforward layer is calculated according to a formula h'=ωLN($h_f$+SA($h_l$)). An output y of the encoder is calculated according to a formula y=ωLN(h'+FFN(h')), where Proj(·) represents a linear mapping, Concat(·) represents a stitching operation based on the formula FFN(h')=∂$W_2$ ($h_l W_1 + c_1$)+$c_2$, ∂ represents a GELU activation function, $c_1$ and $c_2$ are learnable offsets, ω represents a ratio, and LN represents a normalization operation. The feature output from the first feature branch network and a feature y output from the second feature branch network are stitched into a feature vector of the object image. A residual eigenvalue is rescaled by using a smaller value of ω, which helps to enhance a residual connection, and y represents the output of the encoder. After the attention coefficient is learned by the multi-head attention mechanism composed of the self-attention mechanisms, more abundant feature information is captured, and a degree of attention to each feature is obtained. In addition, residual design and layer normalization are added to prevent disappearance of a gradient and accelerate convergence. The new feature on this branch is obtained by using a plurality of encoders.

In step c), a cross-entropy loss $V_{ID}$ is calculated according to a formula $$V_{ID} = -\sum_{i=1}^{n} g_i \log(p_i) \begin{cases} g_i = 0, y \neq i \\ g_i = 1, y = i \end{cases},$$

where $g_i$ represents an indicator variable, n represents a number of classes in the training data set, and $p_i$ represents a predicted probability of a class-i image. The triplet loss function $V_t$ is calculated according to a formula $V_t=[\|v_a-v_p\|^2-\|v_a-\sigma_n\|^2+\alpha]_+$, where $\alpha$ represents a spacing, $v_a$ represents a sample of a class marker learned by the transformer, $v_p$ represents a positive sample of the class marker learned by the transformer, $\sigma_n$ represents a negative sample of the class marker learned by the transformer, $[d]_+$ is max[d,0], and $d=\|v_a-v_p\|^2-\|v_a-\sigma_n\|^2+\alpha$.

Re-recognition of a transport vehicle in a large industrial park is taken as an example. An implementation of the present disclosure is as follows: At first, a plurality of images of the transport vehicle in the industrial park are collected to construct a re-recognition database, ID information of a vehicle image in the database is labeled, and the database is divided into a training set and a test set.

Figure 2:
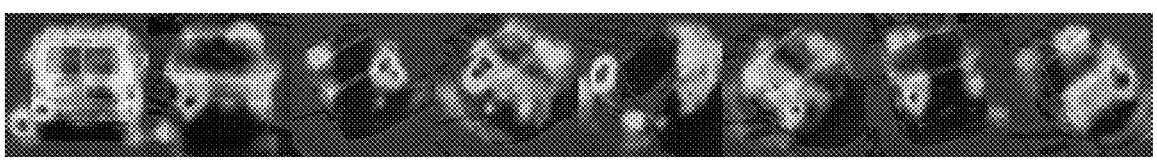
FIG. 2 illustrates a feature map f of the vehicle image processed by using a convolutional layer.

Then, a vehicle image re-recognition model based on multi-feature information capture and correlation analysis is established. The model is divided into a first feature branch network and a second feature branch network. In the first feature branch network, a vehicle image h in the training set is input, where $h \in R^{e \times w \times 3}$, R represents real number space, e represents a quantity of horizontal pixels of the vehicle image (e=256), w represents a quantity of vertical pixels of the vehicle image (w=256), and 3 represents a quantity of channels of each RGB image. The vehicle image is processed by using a convolutional layer to obtain a feature map f of the vehicle image, as shown in FIG. 2.

After that, the feature map f of the vehicle image is processed by using a channel attention mechanism. Global average pooling and global maximum pooling are performed on the feature map to obtain two one-dimensional vectors, and the two one-dimensional vectors are normalized through convolution, ReLU activation function, 1*1 convolution, and sigmoid function operations to weight the feature map. Maximum pooling and average pooling are performed on all channels at each position in a weighted feature map f by using a spatial attention mechanism to obtain a maximum pooled feature map and an average pooled feature map for stitching. 7*7 convolution is performed on a stitched feature map, and then the stitched feature map is normalized by using the batch normalization layer and a sigmoid function. A normalized stitched feature map is multiplied by the feature map f to obtain a new feature.

Figure 3:
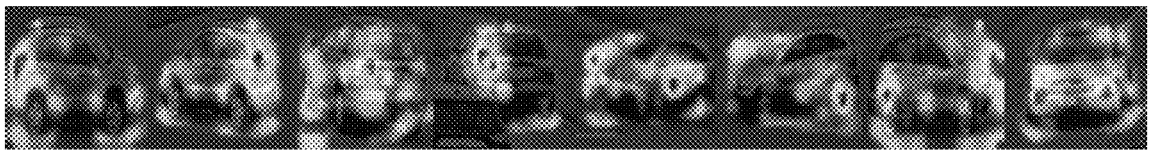
FIG. 3 illustrates a feature map f of the vehicle image processed by using a linear transformation layer.

In the second feature branch network, the vehicle image h in the training set is input and divided into n two-dimensional vehicle image blocks (n=256). Embeddings of the two-dimensional vehicle image blocks are represented as a one-dimensional feature vector $h_f \in R^{n \times (p^2 \cdot 3)}$ of the vehicle image by using a linear transformation layer, where p represents resolution of a vehicle image block (p=16), and $n=ew/p^2$, as shown in FIG. 3.

An average embedding $h_a$ of all the vehicle image blocks is calculated according to a formula $$h_a = \frac{\sum_{i=1}^{n} h_i}{n},$$

where $h_i$ represents an embedding that is of an $i^{th}$ vehicle image block and obtained through initialization based on a Gaussian distribution, and $i \in \{1, \ldots, n\}$. An attention coefficient $a_i$ of the $i^{th}$ vehicle image block is calculated according to a formula $a_i=q^T\sigma(W_1h_0+W_2h_i+W_3h_a)$, where $q^T$ represents a weight, $\sigma$ represents the sigmoid function, $h_0$ represents a class marker of the vehicle image block, and $W_1$, $W_2$, and $W_3$ are weights. A new embedding $h_l$ of each vehicle image block is calculated according to a formula $$h_l = \frac{\sum_{i=1}^{n} a_i h_i}{n}.$$

A new class marker $h_0'$ of the vehicle image block is calculated according to a formula $h_0'=W_4[h_0\|h_l]$, where $W_4$ represents a weight. The new class marker $h_0'$ of the vehicle image block and a sequence with an input size of the vehicle image as $h_f \in \mathbb{R}^{n \times d_c}$ are taken as an overall representation of a new vehicle image, where $d_c=d*m$, d represents a dimension size of a head of each self-attention mechanism in a multi-head attention mechanism (d=96), and m represents a quantity of heads of the multi-head attention mechanism (m=8). Position information is added in the new vehicle image, and the new vehicle image is taken as an input of a transformer encoder. The transformer encoder includes the multi-head attention mechanism and a feedforward layer, and the multi-head attention mechanism is composed of a plurality of self-attention mechanisms. A weight Attention $(h_f,i)$ of an $i^{th}$ value in the sequence $h_f \in \mathbb{R}^{n \times d}$ is calculated according to a formula $$\text{Attention}(h_l, i) = \text{Softmax}\left(\frac{Q_i^T K_i}{\sqrt{d}}\right) V_i,$$

where $Q_i$ represents a vector of an $i^{th}$ queried vehicle, T represents inversion, $K_i$ represents a vector of a correlation between $i^{th}$ queried vehicle image block information and other vehicle image block information, and $V_i$ represents a vector of the $i^{th}$ queried vehicle image block information. A feature embedding $SA(h_f)$ of a new vehicle image output by the multi-head attention mechanism is calculated according to a formula $SA(h_f)=\text{Proj}(\text{Concat}_{i=1}^{m}(\text{Attention}(h_f,i)))$. An input vehicle image h' of the feedforward layer is calculated according to a formula $h'=\omega LN(h_f+SA(h_f))$. An output vehicle image y of the encoder is calculated according to a formula $y=\omega LN(h'+FFN(h'))$, where $\text{Proj}(\cdot)$ represents a linear mapping, $\text{Concat}(\cdot)$ represents a stitching operation $FFN(h')=\partial W_2 (h_f W_1+c_1)+c_2$, $\partial$ represents a GELU activation function, $c_1$ and $c_2$ are learnable offsets, $\omega$ represents a ratio, and LN represents a normalization operation. Finally, the feature output from the first feature branch network and a feature y output from the second feature branch network are stitched into a feature vector of the vehicle image to complete the establishment of the vehicle image re-recognition model.

Then, the vehicle image re-recognition model is optimized by using a cross-entropy loss function and a triplet loss function. A cross-entropy loss $V_{ID}$ is calculated according to a formula $$V_{ID} = -\sum_{i=1}^{n} g_i \log(p_i) \begin{cases} g_i = 0, y \neq i \\ g_i = 1, y = i \end{cases},$$

where $g_i$ represents an indicator variable, n represents a quantity of vehicle image classes in the training data set, and $p_i$ represents a predicted probability of a class-i vehicle image. The triplet loss function $V_t$ is calculated according to a formula $V_t=[\|v_a-v_p\|^2-\|v_a-\sigma_n\|^2+\alpha]_+$, where $\alpha$ represents a spacing, $v_a$ represents a sample of a class marker that is in the vehicle image and learned by a transformer, $v_p$ represents a positive sample of the class marker that is in the vehicle image and learned by the transformer, $v_n$ represents a negative sample of the class marker that is in the vehicle image and learned by the transformer, $[d]_+$ is max[d,0], and $d=\|v_a-v_p\|^2-\|v_a-\sigma_n\|^2+\alpha$.

A trained vehicle image re-recognition model is obtained after the optimization by using the loss functions and is stored.

A to-be-retrieved vehicle image is input into the trained vehicle image re-recognition model to obtain a feature of the to-be-retrieved vehicle image.

Figure 4:
FIG. 4 illustrates a retrieval result.

Finally, the feature of the to-be-retrieved vehicle image is compared with a feature of a vehicle image in the test set, and a comparison result is sorted by similarity measurement. A retrieval result is shown in FIG. 4.

Finally, it should be noted that the above descriptions are only preferred embodiments of the present disclosure and are not intended to limit the present disclosure. Although the present disclosure is described in detail with reference to the foregoing embodiments, a person skilled in the art can still make modifications to the technical solutions described in the foregoing embodiments or make equivalent replacement of some technical features therein. Any modifications, equivalent substitutions, improvements, and the like made within the spirit and principle of the present disclosure should be included within the protection scope of the present disclosure.

What is claimed is:

1. A method for re-recognizing an object image based on a multi-feature information capture and correlation analysis comprising:
    a) collecting a plurality of object images to form an object image re-recognition database, labeling identifier (ID) information of an object image in the object image re-recognition database, and dividing the object image re-recognition database into a training set and a test set;
    b) establishing an object image re-recognition model by using the multi-feature information capture and correlation analysis;
    c) optimizing an objective function of the object image re-recognition model by using a cross-entropy loss function and a triplet loss function to obtain an optimized object image re-recognition model;
    d) marking the object images with the ID information to obtain marked object images, inputting the marked object images into the optimized object image re-recognition model in step c) for training to obtain a trained object image re-recognition model and storing the trained object image re-recognition model;
    e) inputting a to-be-retrieved object image into the trained object image re-recognition model in step d) to obtain a feature of a to-be-retrieved object; and
    f) comparing the feature of the to-be-retrieved object with features of the object images in the test set and sorting comparison results by a similarity measurement
wherein step b) comprises the following steps:
    b-1) setting an image input network to two branch networks comprising a first feature branch network and a second feature branch network;
    b-2) inputting an object image h in the training set into the first feature branch network, wherein $h \in \eth^{e \times w \times 3}$, $\eth$ represents a real number space, e represents a number of horizontal pixels of the object image h, w represents a number of vertical pixels of the object image h, and 3 represents a number of channels of each red, green, and blue (RGB) image; processing the object image h by using a convolutional layer to obtain a feature map f; processing the feature map f by using a channel attention mechanism; performing a global average pooling and a global maximum pooling on the feature map f to obtain two one-dimensional vectors; normalizing the two one-dimensional vectors through a convolution, a Rectified Linear Unit (ReLU) activation function, a 1*1 convolution, and sigmoid function operations in turn to weight the feature map f to obtain a weighted feature map f; performing a maximum pooling and an average pooling on all channels at each position in the weighted feature map f by using a spatial attention mechanism to obtain a maximum pooled feature map and an average pooled feature map; stitching the maximum pooled feature map and the average pooled feature map to obtain a stitched feature map; performing a 7*7 convolution on the stitched feature map, and then normalizing the stitched feature map by using a batch normalization layer and a sigmoid function to obtain a normalized stitched feature map; and multiplying the normalized stitched feature map by the feature map f to obtain a new feature;
    b-3) inputting the object image h in the training set into the second feature branch network, wherein $h \in \eth^{e \times w \times 3}$; dividing the image h into n two-dimensional blocks; representing embeddings of the two-dimensional blocks as a one-dimensional vector $h_i \in \eth^{n \times (p^2 \cdot 3)}$ by using a linear transformation layer, wherein P represents a resolution of an image block, and $n=ew/p^2$; calculating an average embedding $h_a$ of all the two-dimensional blocks according to a formula $$h_a = \frac{\sum_{i}^{n} h_i}{n},$$

wherein $h_i$ represents an embedding of an $i^{th}$ block obtained through a Gaussian distribution initialization, and $i \in \{1, \ldots, n\}$; calculating an attention coefficient $a_i$ of the $i^{th}$ block according to a formula $a_i=q^T\sigma(W_1 h_0+W_2 h_i+W_3 h_a)$, wherein $q^T$ represents a weight, $\sigma$ represents the sigmoid function, $h_0$ represents a class marker, and $W_1$, $W_2$, and $W_3$ are weights; calculating a new embedding $h_l$ of each of the two-dimensional blocks according to a formula $$h_l = \frac{\sum_{i=1}^{n} a_i h_i}{n};$$

and calculating a new class marker $h'_0$ according to a formula $h'_0=W_4[h_0\|h_1]$, wherein $W_4$ represents a weight;
    b-4) taking the new class marker $h'_0$ and a sequence with an input size of $h_i \in \mathbb{R}^{n \times d_c}$ as an overall representation of a new image, wherein $d_c=d*m$, d represents a dimension size of a head of each self-attention mechanism in a multi-head attention mechanism, and m represents a number of heads of the multi-head attention mechanism; adding position information in the new image, and then taking the new image as an input of a transformer encoder to complete the establishment of the object image re-recognition model.

2. The method for re-recognizing the object image based on the multi-feature information capture and correlation analysis according to claim 1, wherein the transformer encoder in step b-4) comprises the multi-head attention mechanism and a feedforward layer;

the multi-head attention mechanism comprises a plurality of self-attention mechanisms; a weight Attention $(h_l, i)$ of an $i^{th}$ value in the sequence $h_l \in \mathbb{R}^{n \times d}$ is calculated according to a formula $$\text{Attention}(h_l, i) = \text{Softmax}\left(\frac{Q_i^T K_i}{\sqrt{d}}\right) V_i,$$

wherein Q represents an $i^{th}$ queried vector, T represents an inversion, $K_i$ represents a vector of a correlation between $i^{th}$ queried information and queried information from other blocks of the two-dimensional blocks, and $V_i$ represents a vector of the $i^{th}$ queried information; a new output embedding $SA(h_l)$ of the multi-head attention mechanism is calculated according to a formula $SA(h_l)=\text{Proj}(\text{Concat}_{i-1}^{m}(\text{Attention}(h_l,i))$; an input h' of the feedforward layer is calculated according to a formula $h'=\omega LN(h_l+SA(h_l))$; an output y of the transformer encoder is calculated according to a formula $y=\omega LN(h'+FFN(h'))$, wherein $\text{Proj}(\cdot)$ represents a linear mapping, $\text{Concat}(\cdot)$ represents a stitching operation, $FFN(h')=\partial W_2(h_l W_1+c_1)+c_2$, $\partial$ represents a Gaussian Error Linear Unit (GELU) activation function, $c_1$ and $c_2$ are learnable offsets, $\omega$ represents a ratio, LN represents a normalization operation; and the new feature output from the first feature branch network and a feature y output from the second feature branch network are stitched into a feature vector of the object image.

3. The method for re-recognizing the object image based on the multi-feature information capture and correlation analysis according to claim 1, wherein in step c), a cross-entropy loss $V_{ID}$ is calculated according to a formula $$V_{ID} = -\sum_{i=1}^{n} g_i \log(p_i) \begin{cases} g_i = 0, y \neq i \\ g_i = 1, y = i \end{cases},$$

wherein $g_i$ represents an indicator variable, n represents a number of classes in the training set, and $P_i$ represents a predicted probability of a class-i image; and the triplet loss function $V_t$ is calculated according to a formula $V_t=[\|v_a-v_p\|^2-\|v_a-v_n\|^2+\alpha]_+$, wherein $\alpha$ represents a spacing, $v_a$ represents a sample of a class marker learned by a transformer, $v_p$ represents a positive sample of the class marker learned by the transformer, $v_n$ represents a negative sample of the class marker learned by the transformer, $[d]_+$ is $\max[d,0]$, and $d=\|v_a-v_p\|^2-\|v_a-v_n\|^2+\alpha$.

* * * * *